US012276785B2

(12) United States Patent
Hajjar et al.

(10) Patent No.: US 12,276,785 B2
(45) Date of Patent: Apr. 15, 2025

(54) TWO-AXIS BEAM SCANNING SYSTEMS AND DISPLAY SYSTEMS WITH MULTIPLE BEAM SCANNERS

(71) Applicant: Prysm Systems Inc., Milpitas, CA (US)

(72) Inventors: Roger A. Hajjar, San Jose, CA (US); Arthur R. Telkamp, Livermore, CA (US)

(73) Assignee: Prysm Systems Inc., Milpitas, CA (US)

( * ) Notice: Subject to any disclaimer, the term of this patent is extended or adjusted under 35 U.S.C. 154(b) by 792 days.

(21) Appl. No.: 17/489,304

(22) Filed: Sep. 29, 2021

(65) Prior Publication Data

US 2023/0098021 A1    Mar. 30, 2023

(51) Int. Cl.
*G02B 26/10* (2006.01)
*G09G 3/02* (2006.01)

(52) U.S. Cl.
CPC ........... *G02B 26/101* (2013.01); *G09G 3/025* (2013.01)

(58) Field of Classification Search
CPC .. G02B 26/101; G02B 26/0825; G09G 3/025; G09G 2300/026; G09G 3/2003; G09G 2320/0646
See application file for complete search history.

(56) References Cited

U.S. PATENT DOCUMENTS

| | | | |
|---|---|---|---|
| 6,888,655 B2 | 5/2005 | Yamaguchi | |
| 7,791,561 B2 | 9/2010 | Hajjar et al. | |
| 7,869,112 B2 | 1/2011 | Borchers et al. | |
| 7,878,657 B2 | 2/2011 | Hajjar | |
| 8,136,951 B2 | 3/2012 | Murata et al. | |
| 9,075,294 B2 | 7/2015 | Watanabe | |
| 9,998,717 B2 | 6/2018 | Hajjar et al. | |
| 11,128,845 B2 | 9/2021 | Hajjar | |

(Continued)

FOREIGN PATENT DOCUMENTS

| | | |
|---|---|---|
| CN | 101216659 | 7/2008 |
| CN | 102681306 | 9/2012 |

(Continued)

OTHER PUBLICATIONS

PCT International Search Report and Written Opinion in International Appln. No. PCT/US2019/034060, dated Sep. 19, 2019, 11 pages.

(Continued)

*Primary Examiner* — Joseph P Martinez
*Assistant Examiner* — Ray Alexander Dean
(74) *Attorney, Agent, or Firm* — Fish & Richardson P.C.

(57) ABSTRACT

A display system includes a display screen, a light source to generate a light beam to be modulated in accordance with image data, and a beam scanning module to receive the light beams and to direct the light beam onto an associated display region of the display screen. The beam scanning module includes a resonant mirror configured to scan the light beam along a first scanning direction across the associated display region, and a linear scanning mirror to scan the light beam along a second scanning direction across the associated display region. The beam scanning module also includes an integral fold mirror positioned to reflect the light beam from the light source to the resonant mirror.

18 Claims, 11 Drawing Sheets

(56) References Cited

U.S. PATENT DOCUMENTS

| | | |
|---|---|---|
| 2002/0180869 A1 | 12/2002 | Calllison |
| 2006/0145945 A1 | 7/2006 | Lewis et al. |
| 2006/0164707 A1 | 7/2006 | Kurihara et al. |
| 2007/0206258 A1 | 9/2007 | Malyak et al. |
| 2009/0022188 A1 | 1/2009 | Almoric et al. |
| 2009/0102830 A1 | 4/2009 | Yeo |
| 2009/0141192 A1 | 6/2009 | Nojima |
| 2010/0020377 A1 | 1/2010 | Borchers et al. |
| 2010/0097678 A1 | 4/2010 | Hajjar et al. |
| 2010/0245957 A1* | 9/2010 | Hudman .............. G02B 26/101 359/201.1 |
| 2011/0298820 A1 | 12/2011 | Hajjar |
| 2012/0176347 A1 | 7/2012 | Mahajan |
| 2013/0335641 A1 | 12/2013 | Aoki et al. |
| 2018/0007330 A1 | 1/2018 | Hajjar |
| 2018/0278898 A1 | 9/2018 | Hajjar et al. |
| 2020/0182977 A1 | 6/2020 | Wang et al. |
| 2020/0242988 A1* | 7/2020 | Hajjar ..................... G09G 3/02 |
| 2021/0218939 A1 | 7/2021 | Hajjar |

FOREIGN PATENT DOCUMENTS

| | | |
|---|---|---|
| EP | 2411859 | 2/2012 |
| JP | 2005-024958 | 1/2005 |
| JP | 2006-184750 | 7/2006 |
| KR | 10-2015-0042958 | 4/2015 |
| WO | WO 2000/020912 | 4/2000 |
| WO | WO 2010/111216 | 9/2010 |
| WO | WO 2019/231862 | 12/2019 |

OTHER PUBLICATIONS

International Search Report and Written Opinion in International Appln. No. PCT/US2022/044932, mailed Jan. 18, 2023, 17 pages.

* cited by examiner

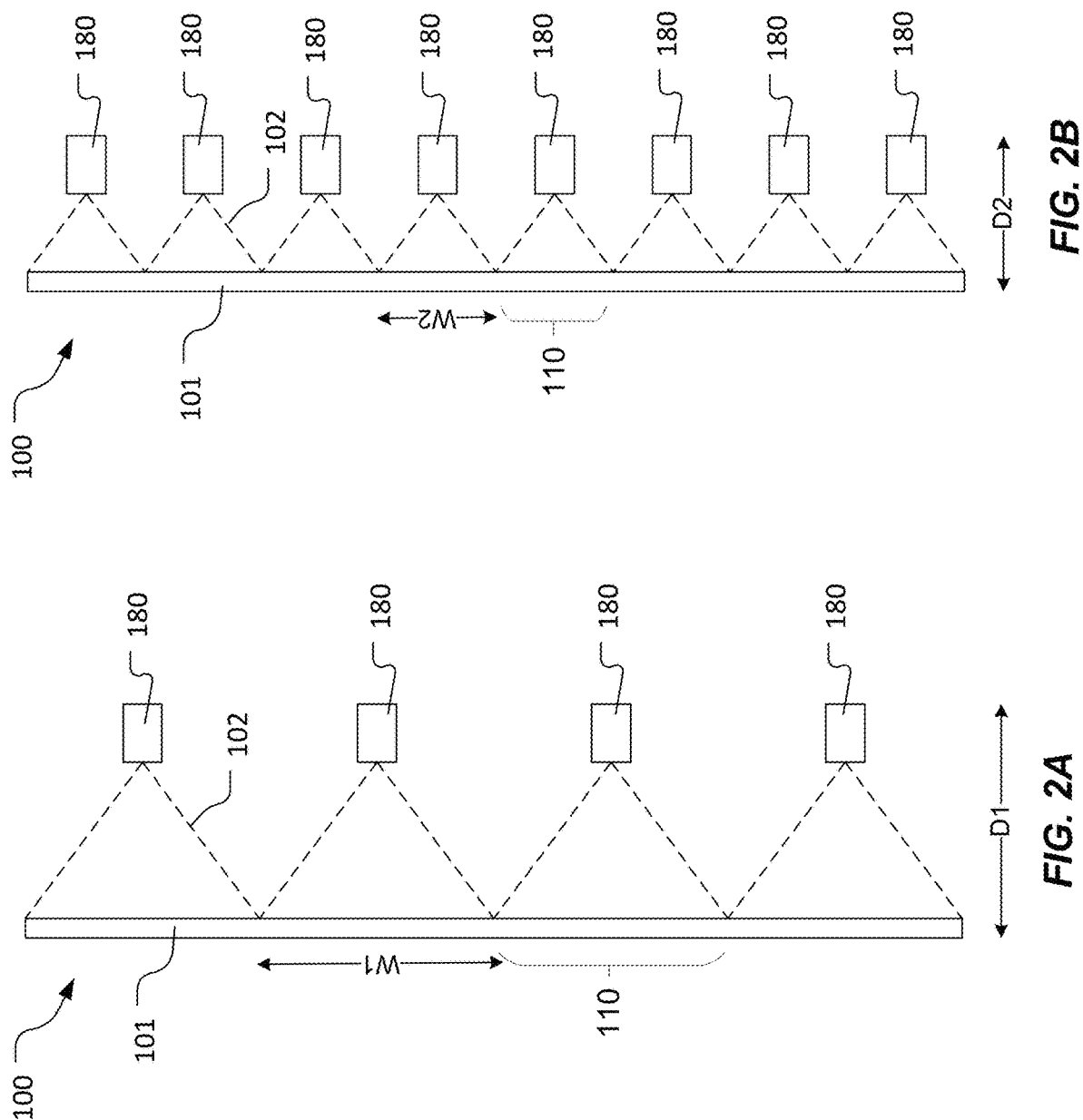

TWO-AXIS BEAM SCANNING SYSTEMS AND DISPLAY SYSTEMS WITH MULTIPLE BEAM SCANNERS

BACKGROUND

This document relates to scanning-beam display systems.

In a scanning-beam display system, an optical beam can be scanned over a screen to form images on the screen. Some display screens comprise fluorescent material, and the optical beam causes portions of the fluorescent material to fluoresce to the form images. Some such scanning-beam display systems include a two-axis scanner system that can scan the optical beam in two perpendicular directions on the receiving surface. For example, a two-axis scanner system can include a horizontal scanning mirror and a vertical scanning mirror. The horizontal scanning and the vertical scanning and modulation of the optical beam with image data are synchronized to each other to project images on the screen.

SUMMARY

Examples and implementations of techniques and display systems are described that provide a display screen that includes constituent display regions, with each display region addressed by a separate scanning beam engine.

In one aspect, a display system includes a display screen, a light source to generate a light beam to be modulated in accordance with image data, and a beam scanning module to receive the light beams and to direct the light beam onto an associated display region of the display screen. In some implementations, the beam scanning module includes a resonant mirror configured to scan the light beam along a first scanning direction across the associated display region; a linear mirror chip configured to scan the light beam along a second scanning direction across the associated display region; and a fold mirror covering a portion of the outer support structure. The linear mirror chip includes: (i) an outer support structure with electrical circuitry formed thereon and (ii) a linear mirror pivotably coupled to the outer support structure, the linear mirror arranged to redirect the light beam from the resonant mirror. The portion covered by the fold mirror is positioned on a side of the linear mirror along a scanning direction of the resonant mirror across the linear mirror chip. The fold mirror is positioned to reflect the light beam from the light source to the resonant mirror.

Implementations of the display may include one or more of the following optional features. The linear mirror may be pivotably coupled to the outer support structure by a torsion arm. The fold mirror may cover at least a portion of the torsion arm. The display screen may comprise fluorescent material, and the light beam may be an excitation beam to cause portions of the fluorescent material to fluoresce. The fluorescent material may comprise parallel stripes of the fluorescent material extending along the second scanning direction. The resonant mirror may be pivotable about a first axis. The linear mirror may be pivotable about a second axis. The first axis may be orthogonal to the second axis. The fold mirror may be arranged to reflect the light beam directly to the resonant mirror along a path that is free of any intervening optical components. The fold mirror may be arranged to reflect the light beam substantially perpendicular to the first axis. The portion of the outer support structure covered by the fold mirror may be configured to control pivoting movements of the linear mirror. The fold mirror may be planar and parallel to a plane of the outer support structure. The fold mirror may be configured to reflect the light beam exclusively to within an outer periphery of the resonant mirror.

In another aspect, this disclosure is directed to a two-axis scanner system that includes a resonant mirror configured to receive a light beam directly from a fold mirror and to scan the light beam along a first scanning direction; a linear mirror chip configured to receive the light beam from the resonant mirror and to scan the light beam along a second scanning direction; and the fold mirror. The linear mirror chip includes: (i) an outer support structure and (ii) a linear mirror pivotably coupled by a torsion arm to the outer support structure. The fold mirror is positioned to cover a portion of the outer support structure on a side of the linear mirror along a scanning direction of the resonant mirror across the linear mirror chip.

Implementations of the two-axis scanner system may include one or more of the following optional features. The fold mirror may cover at least a portion of the torsion arm. The resonant mirror may be pivotable about a first axis. The linear mirror may be pivotable about a second axis. The first axis may be orthogonal to the second axis. The fold mirror may be arranged to reflect the light beam orthogonally to the first axis. The portion of the outer support structure covered by the fold mirror may be configured to control pivoting movements of the linear mirror. The fold mirror may be planar and parallel to a plane of the outer support structure.

In another aspect, this disclosure is directed to a light engine for a display system. The light engine includes a light source to generate a light beam modulated in accordance with image data, and a two-axis beam scanning system to receive the light beam from the light source and to direct the light beam onto a display screen. The two-axis beam scanning system includes: a resonant mirror configured to receive a light beam from a fold mirror and to scan the light beam along a first scanning direction; a linear mirror chip configured to receive the light beam from the resonant mirror and to scan the light beam along a second scanning direction; and the fold mirror. The linear mirror chip includes an outer support structure and a linear mirror pivotably coupled by a torsion arm to the outer support structure. The fold mirror is positioned to cover at least a portion of the torsion arm.

Implementations of the light engine may include one or more of the following optional features. The light engine may also include a controller configured to receive image data including pixel data representing intensity values of pixels and to modulate the light beam in accordance with the image data. A combination of oscillation of the resonant mirror and pivoting motions of the linear mirror may generate a sinuous path for the light beam to traverse. The resonant mirror may be arranged to oscillate about a first axis. The linear mirror may be pivotable about a second axis orthogonal to the first axis. The fold mirror may be arranged to reflect the light beam directly to the resonant mirror without any intervening optical components and orthogonally to the first axis.

Potential advantages may include (and are not limited to) one or more of the following.

The depth of a scanning display system (e.g., the minimum distance behind the screen required by the display system) can be decreased, without significantly increasing or even while decreasing cost.

The details of one or more embodiments are set forth in the accompanying drawings and the description below. Other aspects, features and advantages will be apparent from the description, drawings and claims.

BRIEF DESCRIPTION OF THE DRAWINGS

FIG. 2A is a schematic side view of an example of a display system that uses multiple beam scanners to address multiple display regions of a display screen.

FIG. 2B is a schematic side view of another example of a display system that uses multiple beam scanners to address multiple display regions of a display screen.

DETAILED DESCRIPTION

Large scale displays (also called large format displays or large screen displays) are useful as "floor to ceiling" displays, and can have an imaging surface of 8 ft. square or larger. It is generally desirable for a large scale display to be thin, so to conserve usable square footage in the area in which the display is installed.

In some display systems, particularly large scale displays, a display screen can have regions that are separately addressed by separate scanning beams. In general, the larger the region addressed by a scanning beam, the greater the depth needed by the display system. Even use of conventional complex optical paths may not alleviate this problem entirely. However, by integrating a fold mirror into a two-axis scanner as described herein, the depth of the display system can be decreased without significantly increasing or even while decreasing cost. In addition, the two-axis scanners described herein advantageously provide scanning beams without the need for complex beam splitting optics or a polygon mirror scanner. For example, one of the scanning mirrors can be a conventional linear mirror, and the other scanning mirror can be a relatively low-cost resonant mirror. Consequently, a reduced depth of the display system can be achieved while decreasing cost. Moreover, by placing the fold mirror over a portion of one of the beam scanners, the light beam can impinge each scanning mirror at close to a normal incidence, thus maintaining the beam spot as substantially circular as well as reducing optical distortions effects keystone effect, and thus improving image quality.

Figure 1A:
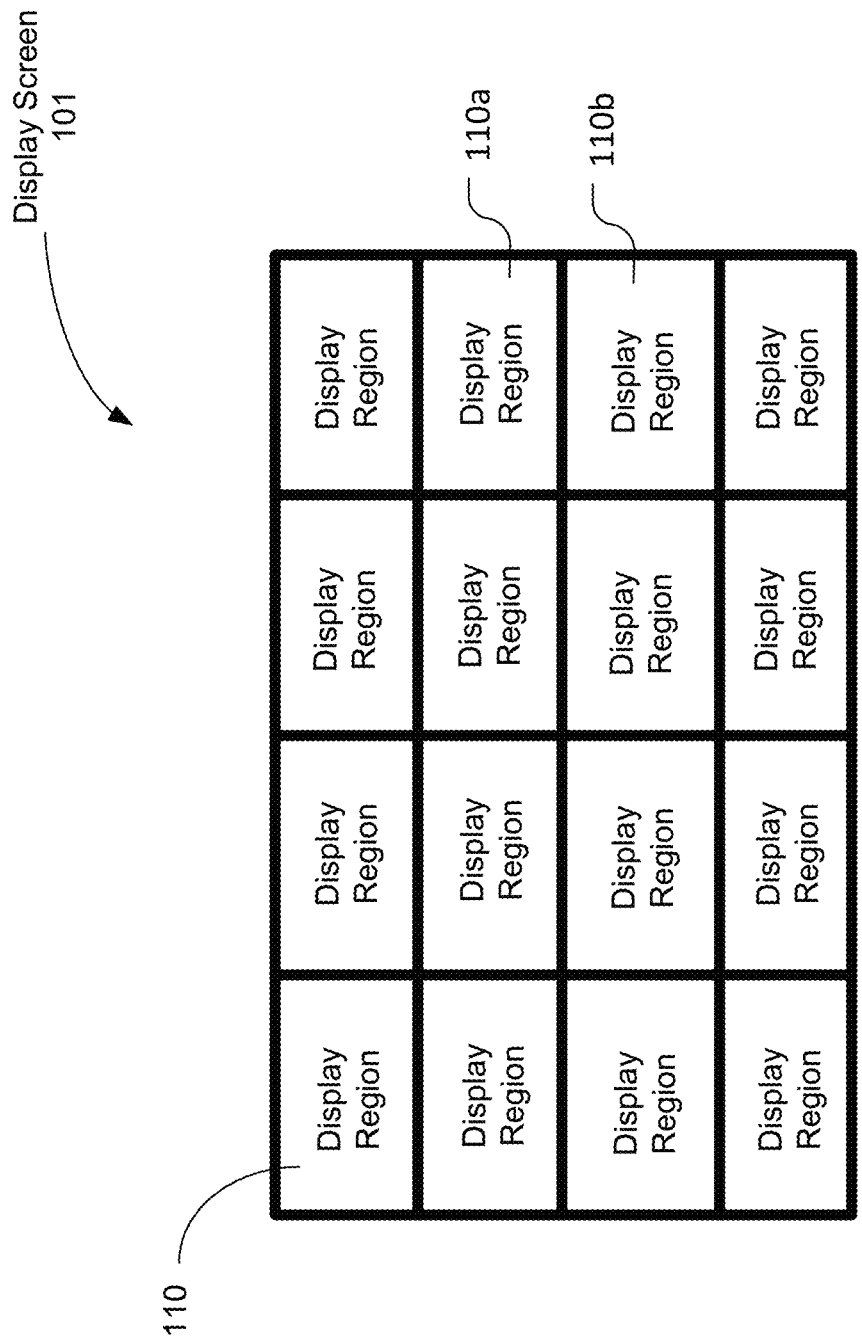
FIG. 1A is a schematic front view of an example of a display screen with multiple constituent display regions.

FIG. 1A shows an example of a display screen 101 on which multiple constituent display regions 110 are generated by multiple scanning beam engines that each include one or more light sources. The display regions 110 are arranged in an array, e.g., a rectangular array. Each display region 110 can be quadrilateral, e.g., generally rectangular, although this is not required. The display regions 110 can abut or slightly overlap.

Figure 1B:
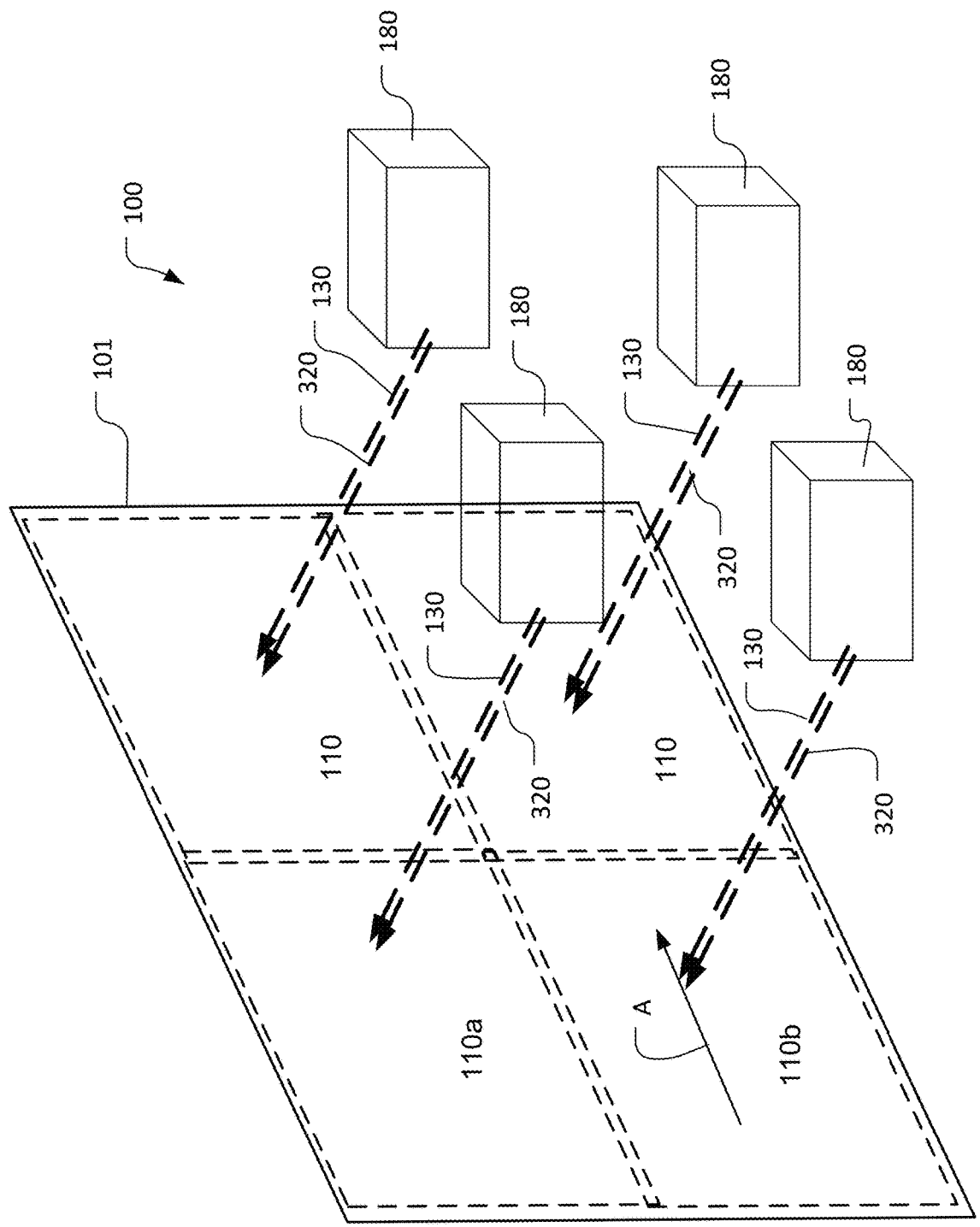
FIG. 1B is a schematic perspective view of an example of multiple scanning beams being used to address multiple display regions of a display screen.

Referring to FIGS. 1A and 1B, the display screen 101 can be part of a scanning beam display system 100. As shown in FIG. 1B, for each display region 110 there is an associated scanning beam engine 180. Each scanning beam engine 180 includes a light source that generates an excitation beam or scanning beam 320, e.g., a light beam (including IR and/or, UV light), e.g., a laser beam, that scans, e.g., raster scans or bi-directional raster scans (i.e., each consecutive line is scanned in an opposite direction), across the associated display region 110 of the display screen 101. In some implementations, the scan can have a fast scan direction, e.g., as shown by arrow A, and a slow scan direction, e.g., perpendicular to the fast scan direction.

Figure 1C:
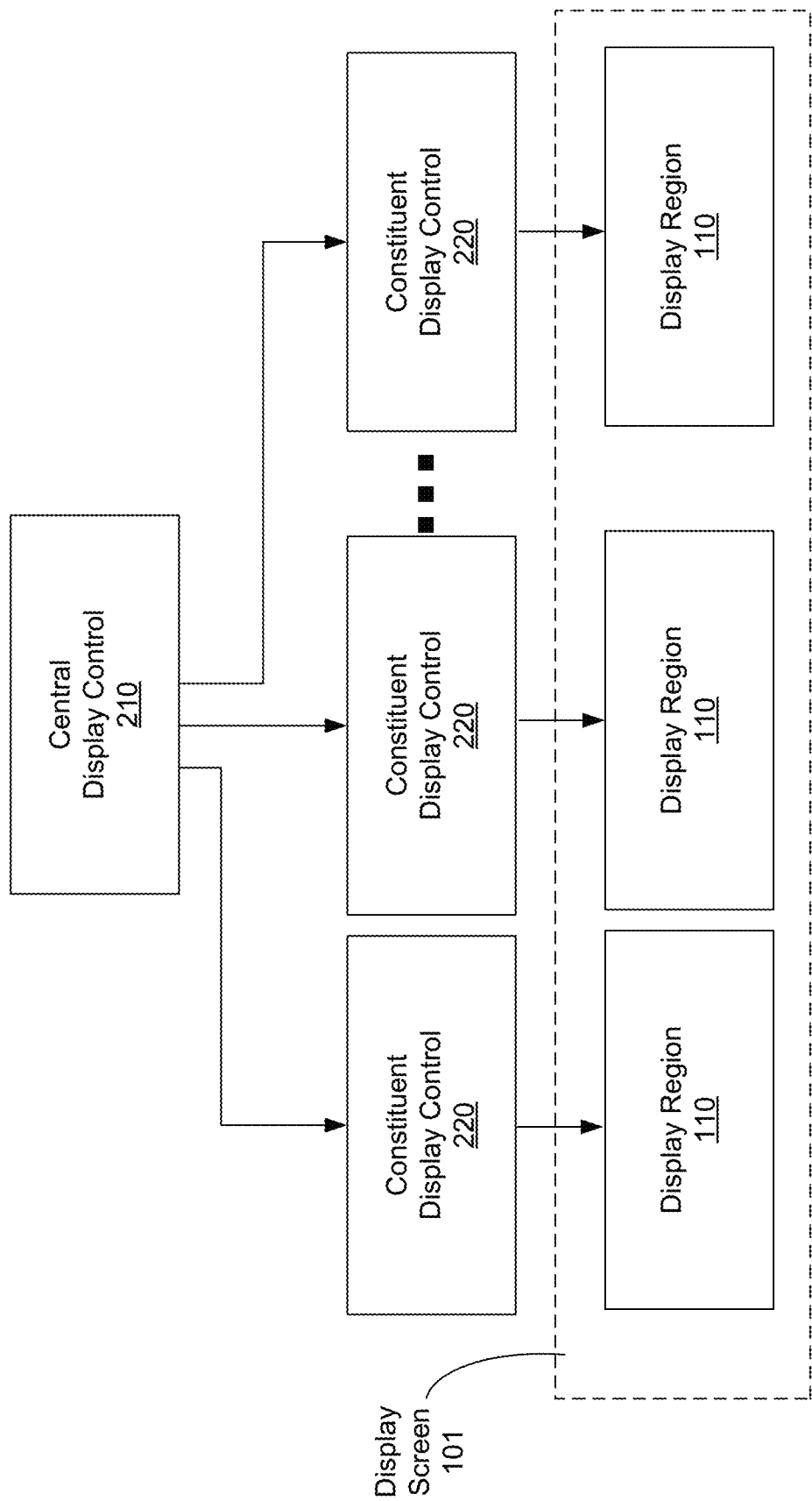
FIG. 1C is a schematic diagram of example of a control system for the display screen in FIG. 1A.

FIG. 1C shows an example of the control system for the display screen 101 in FIG. 1. In this example, each constituent display region 110 has its own display controller 220 that controls the operations of each display region 110. A central controller 210 for the display 100 is connected in communication with the display controllers 220 for the constituent display regions 110. The central controller 210 can receive image data, e.g., from a computer or the like, and divide the image data into portions that are directed to each display controller 220, which causes the associated display region 110 to display a fraction of the full image displayed by the display screen 100. Alternatively, the display system could include just the single controller 210 directly coupled to each scanning beam engine 180.

Referring to FIG. 2A, each scanning beam engine 180 will have a field of view 102 in which an image can be effectively projected onto the display screen 101. The angle subtended by the field of view 102 is generally limited, e.g., by the maximum deflection of the physical components and/or by aperture size of optical components. As such, the distance of the scanning beam engine 180 from the screen 101, and thus the depth D1 of the display 100, will depend on the width W1 or height of the constituent display regions 110 region.

In some implementations, the area of the display region 110 may be proportional to the larger angle of the two optical angles scanned by the fast optical scanner (e.g., the horizontal scanner) and the slow scanner (e.g., the vertical scanner), multiplied by the optical depth of the system. The optical depth is the distance from the scanner to the surface of the display screen 101. The optical depth is a function of the optical system magnification between the light source, e.g., the laser diode, and the display screen 101.

Still referring to FIGS. 2A and 2B, by reducing the width of the constituent display regions 110 (shown by width W2 in FIG. 2B), the distance of the scanning beam engine 180 from the screen 101 can also be reduced, and thus the depth D2 of the display 100 will also be reduced.

Notably, the reduction in the size of the display region 110 while keeping the same size of the display screen 101 will necessitate a larger number display regions 110 and thus a larger number of scanning beam engines 180. For example, if the dimensions of the display regions are halved, the number of scanning beam engines increases by a factor of four. In general, such an approach would be counter-intuitive, because scaling of the number of beam scanning components would be cost prohibitive. However, use of a servo feedback system can enable the use of lower accuracy and lower cost scanning components, e.g., resonant scanning mirrors. Consequently, the depth of the display system can be decreased, without significantly increasing or even while decreasing cost.

Returning to FIGS. 1A and 1B, in a scanning beam display system 100, each display region 110 of the screen 101 can include light-emitting materials or fluorescent materials that emit light under excitation from the associated scanning beam 320. In some implementations, three different color phosphors that are optically excitable by the laser beam to respectively produce light in red, green, and blue colors suitable for forming color images may be formed on the screen as pixel dots or repetitive red, green and blue phosphor stripes in parallel.

Phosphor materials are one type of fluorescent materials. However, other optically excitable, light-emitting, non-phosphor fluorescent materials can be used. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

A scanning beam display system uses at least one scanning beam 320 to excite color light-emitting materials deposited on a screen to produce color images. The scanning beam is modulated to carry image information in red, green and blue color channels and is controlled in such a way that the scanning beam excites the color red, green and blue light-emitting materials with image information for each of the red, green and blue color phosphors, respectively. Hence, the scanning beam carries the image information but does not directly produce the visible light seen by a viewer. Instead, the light-emitting fluorescent materials on the screen absorb the energy of the scanning beam and emit visible light in red, green and blue to generate actual color images seen by the viewer. Of course, the display system 100 can use different and/or additional colors and/or color phosphors.

Figure 3:
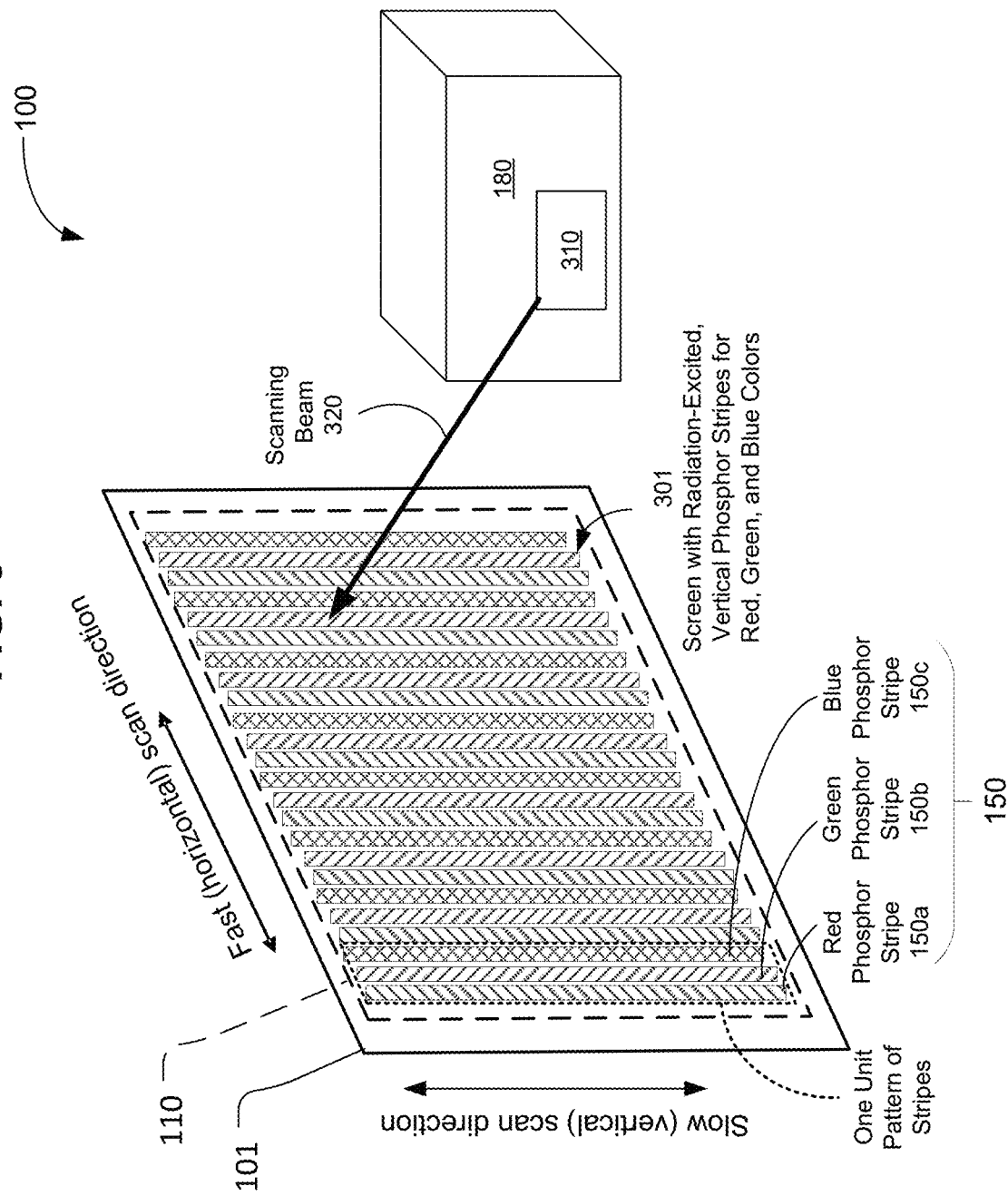
FIG. 3 is a schematic perspective view of an example scanning laser display system having a light-emitting screen made of laser-excitable light-emitting materials (e.g., phosphors) to emit colored light under excitation of a scanning laser beam that carries the image information to be displayed.

FIG. 3 illustrates an example of a scanning beam display system 100. The system includes a scanning beam engine 180 that includes a light source 310, e.g., a laser module, to produce and project at least one scanning beam 320, e.g., a laser beam, onto a display region 110 of the screen 101. The display system 100 is configured as rear scanning system where the viewer and the scanning beam engine 180 are on the opposite sides of the screen 101. Although this system 100 illustrates only a single scanning beam engine 180, the discussion below can be applied to each scanning beam engine 180 and each display region of the screen 101.

The scanning beam 320 provides an optical excitation beam to excite fluorescent material in the screen. In some implementations, each scanning beam engine 180 generates only a single optical excitation beam 320. Each scanning beam engine 180 is configured to drive the scanning beam 320 in a fast scan direction, e.g., horizontally, and in a slow scan direction, e.g., vertically, that can be substantially perpendicular to the fast scan direction. The scan frequency (number of traversals of the screen per second) in the fast scan direction can be thirty to one-hundred times faster than the scan frequency in the slow scan direction. Accordingly, the optical excitation beam can excite the fluorescent materials across the screen 101 in the fast scan direction while also traveling in the slow scan direction, thereby covering the entire display region of the screen 101.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range.

The excitation optical beam that excites a fluorescent material on the screen can be at a frequency or in a spectral range that is higher in frequency than the frequency of the emitted visible light by the fluorescent material. Accordingly, in some implementations the excitation optical/light beam may be in the violet spectral range and the ultra violet (UV) spectral range, e.g., wavelengths under 420 nm. In the examples described below, a violet or a UV laser beam is used as an example of the excitation light for a phosphor material or other fluorescent material and may be light at other wavelengths (e.g., 440 nm to 460 nm).

In the example scanning beam display system 100 illustrated in FIG. 3, the screen 101 has parallel color phosphor stripes 150 that extend in the vertical direction. Pairs of adjacent phosphor stripes 150 are made of different phosphor materials that emit light in different colors. In the illustrated example, red phosphor 150a absorbs the laser light to emit light in red, green phosphor 150b absorbs the laser light to emit light in green and blue phosphor 150c absorbs the laser light to emit light in blue. Three adjacent color phosphor stripes are in three different colors. One particular spatial color sequence of the stripes is shown in FIG. 1 as red, green and blue. Other color sequences may also be used. The fast scan direction of the scanning beam engine 180 can be perpendicular to the color phosphor stripes, and the slow scan direction of the scanning beam engine 180 can be parallel to the color phosphor stripes.

The excitation beam 320 is at the wavelength within the optical absorption bandwidth of the color phosphors and is usually at a wavelength shorter than the visible blue and the green and red colors for the color images. As an example, the color phosphors may be phosphors that absorb UV light in the spectral range below 420 nm to produce desired red, green and blue light.

The light source 310 can include one or more lasers, e.g., UV diode lasers, to produce one or more light beams 320, a beam scanning mechanism (e.g., an X/Y scanner as described further herein) to scan the beam 320 horizontally and vertically to render one image frame at a time on the screen 101, and a signal modulation mechanism to modulate (e.g., using pulse width modulation or pulse amplitude modulation) the beam 320 to carry the information for image channels for red, green and blue colors in accordance with image data.

Each scanning beam engine 180 can include a laser source to produce a scanning laser/light beam that excites a phosphor material on the screen 101. The laser source can be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam 320 may have multiple modes to spread over a larger area than the beam spread in the direction across the phosphor stripe. This use of a laser beam with a single mode in one direction to have a small beam footprint on the screen 101 and multiple modes in the perpendicular direction to have a larger footprint on the screen allows the beam to be shaped to fit the elongated color subpixel on the screen 101 and to provide sufficient laser power in the beam via the multimodes to ensure sufficient brightness of the screen 101.

Although phosphor stripes are described above, alternatively, the display screen 101 could include color pixilated light-emitting areas that define the image pixels on the screen.

Figure 4A:
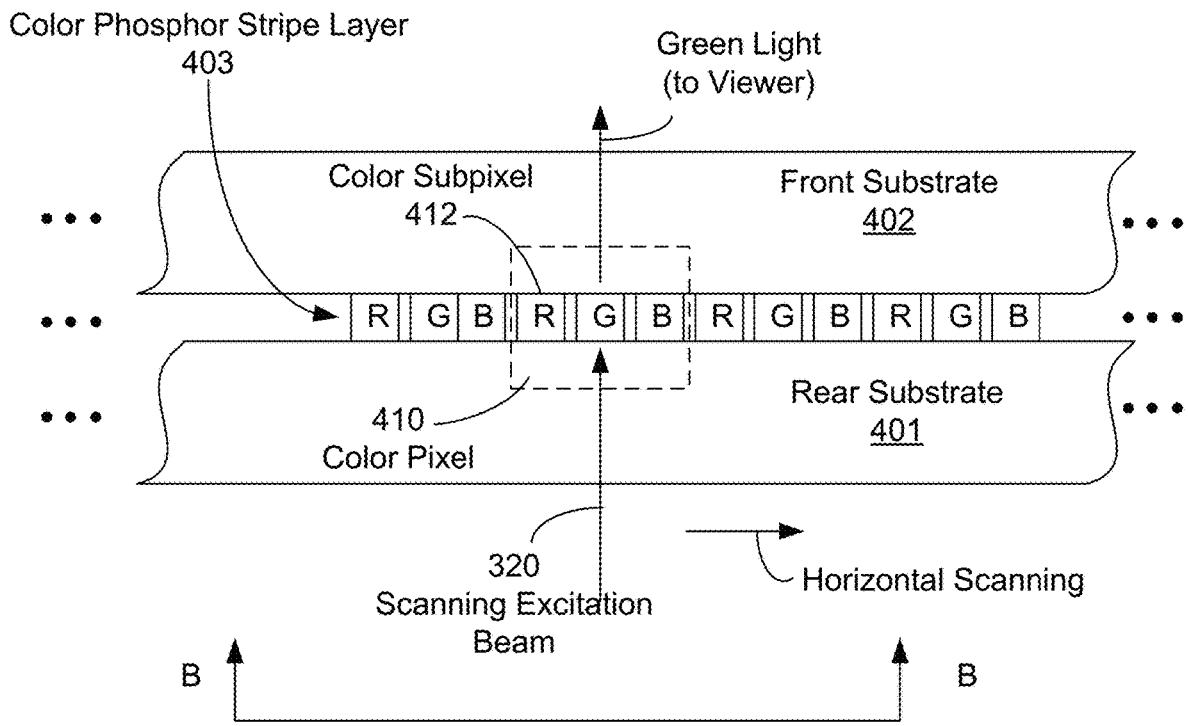
FIGS. 4A and 4B are a schematic cross-sectional side view and schematic top view, respectively, of one example screen structure with parallel light-emitting stripes and the structure of color pixels on the screen in FIG. 2.

FIG. 4A shows an exemplary design of the screen 101 in FIG. 3. The screen 101 may include a rear substrate 401 which is transparent to the scanning light beam 320 and faces the light source 310 to receive the scanning light beam 320. A front substrate 402 is fixed relative to the rear substrate 401 and faces the viewer in a rear scanning configuration.

A color phosphor stripe layer 403 is placed between the substrates 401 and 402 and includes phosphor stripes. The color phosphor stripes for emitting red, green and blue colors are represented by "R", "G" and "B," respectively. The front substrate 402 is transparent to the red, green and blue colors emitted by the phosphor stripes. The substrates 401 and 402 may be made of one or more various materials, including glass or plastic panels. The rear substrate 401 can be a thin film layer and can be configured to reflect the visible energy toward the viewer. In some implementation, the front substrate is not used; the color phosphor stripe layer is exposed.

Each color pixel includes portions of three adjacent color phosphor stripes in the horizontal direction and its vertical dimension is defined by the beam spread of the scanning beam 320 in the vertical direction. As such, each color pixel includes three subpixels of three different colors (e.g., the red, green and blue). The module 180 scans the scanning beam 320 along the fast direction, e.g., from left to right and/or right to left, to form one line at a time along the slow direction, e.g., from top to bottom, to fill the screen 101.

Figure 4B:
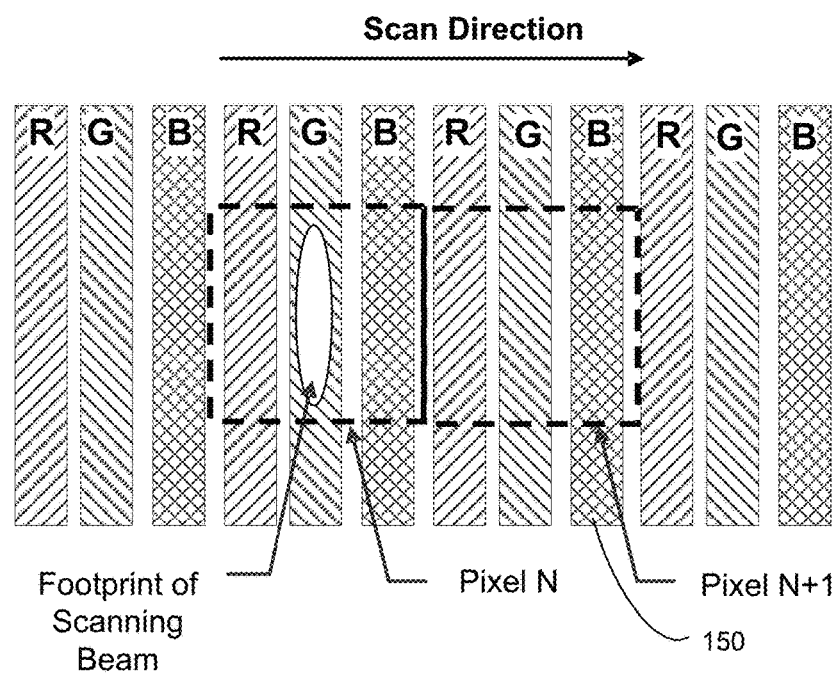

FIG. 4B further shows the operation of the screen 101 in a view along the direction B-B perpendicular to the surface of the screen 101. Since each color stripe 150 is longitudinal in shape, the cross-section of the footprint of the beam 320 may be shaped to be elongated along the direction of the color stripes 150 to maximize the fill factor of the beam within each color stripe of a pixel. In some implementations, this may be achieved by using a beam shaping optical element in the scanning beam engine 180.

Figure 5:
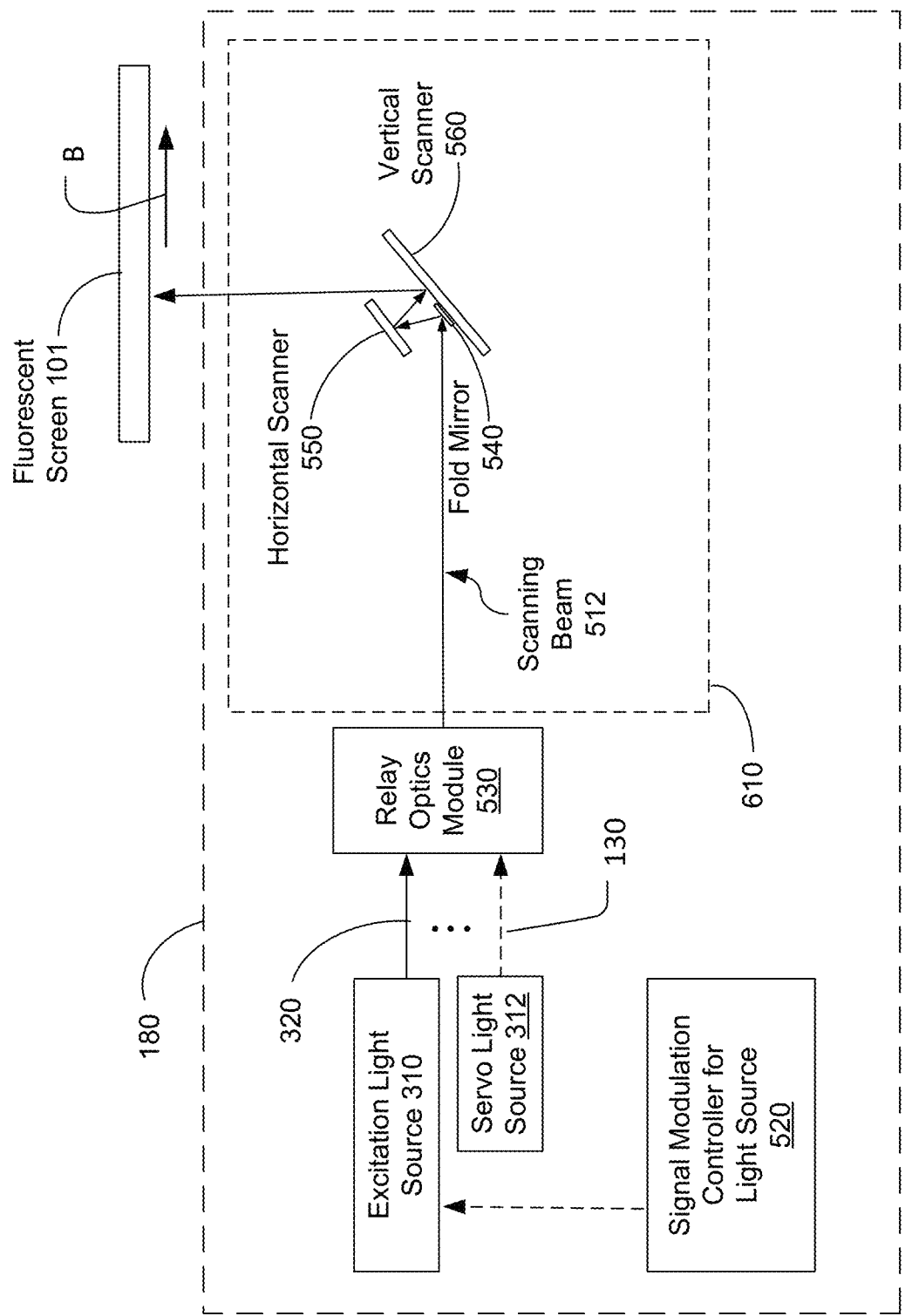
FIG. 5 is a schematic diagram of an example implementation of a scanning beam display system.

FIG. 5 shows an example implementation of a single scanning beam engine 180 from the array of scanning beam engines. The scanning beam engine 180 includes an excitation light source 310 to generate a single excitation light beam 320 to scan the screen 101. In some implementations, the excitation light beam 320 can be a laser beam, and the excitation light source 310 can be a laser or a diode laser.

In some implementations, the scanning beam engine 180 can also include a servo light source 310 to generate a single servo beam 130 to scan the screen 101. The servo beam 130 can have a different wavelength than the excitation beam 320. For example, the excitation beam can be in the ultraviolet range, whereas the servo beam 130 can be in the infrared range. The servo light beam 130 can be a laser beam, and the servo light source 310 can be a laser or a diode laser. In some implementations, the servo light source 312 is an IR laser and the excitation light 310 source is a UV laser. In some implementations, the use of other ways of monitoring the location of the excitation beam (e.g., using a camera, using one or more photo detectors, etc.) can preclude the need for the servo beam 130 being alongside of the excitation beam 320.

Thus, in this implementation the scanning beam engine generates exactly two scanning beams 512, i.e., the excitation beam 320 and the servo beam 130. In some implementations, other forms of monitoring excitation beam location (such as a camera or photo detector) can preclude the need for the servo beam 130 being alongside the excitation beam 320.

The various components, e.g., servo light source 312, relay optics module 530 and scanning projection module 610, can be configured such that the servo beam 130 is collinear with the excitation beam 320. In some implementations, the components are configured such that the servo beam 130 travels a path parallel with the excitation beam 320. In particular, the path of the servo beam 130 on the screen can be collinear with the path of the excitation beam 320 on the screen. The servo beam 130 can be slightly in advance or trailing (e.g., by 10-15 mm) of the excitation beam 320 in space and/or time along the fast-scan direction of travel, e.g., direction A. However, the servo beam 130 is not separated from the excitation beam 320 by more than the spacing between servo lines.

A signal modulation controller 520 is provided to control and modulate the excitation beam 320. For example, the modulation controller 520 can control and modulate the excitation light source 310 so that the excitation light beam 320 is modulated to carry the image to be displayed in the corresponding display region 110 on the screen 101. The signal modulation controller 520 can include a digital image processor that generates digital image excitation signals for the three different color channels. The signal modulation controller 520 can include laser driver circuits that produce control signals carrying the digital image signals or image data. The control signals are then applied to modulate the light source 310, e.g., the current for a laser diode.

The beam scanning can be achieved by a beam scanning module 610 (also referred to herein as a "two-axis scanner," an "X/Y scanner system," or simply as an "X/Y scanner"). The scanning module 610 scans the scanning beam(s) 512 across a horizontal direction (the "X" direction) of the display screen 101 and across a vertical direction (the "Y" direction) of the display screen 101. The horizontal scanning is performed at a higher speed (or frequency) than the speed (or frequency) of the vertical scanning.

In some implementations, relay optics 530, e.g., mirrors, focusing lenses, etc., can be used to direct the excitation beam 320 and servo beam 130 to the scanning module 610. The excitation beam 320 and servo beam 130 can have their own separate lenses rather than a common lens. The focal points for each lens can be on the surface of the screen 101, e.g., the panel (rather than on the scanning mirror(s) discussed below).

In the depicted implementation, the scanning module 610 includes a fold mirror 540, a first mirror scanner 550 (e.g., a horizontal scanner 550), and a second mirror scanner 560 (e.g., a vertical scanner 560). The light beam 512 enters the scanning module 610 and impinges first on the fold mirror 540. The fold mirror 540 reflects the light beam 512 to the horizontal scanner 550. An oscillating mirror of the horizontal scanner 550, in turn, reflects the light beam 512 to the vertical scanner 560. An oscillating mirror of the vertical scanner 560, in turn, reflects the light beam 512 to the display screen 101. The simultaneous, combined oscillations of the mirrors of the horizontal scanner 550 and the vertical scanner 560 cause the two-axis scanning of the light beam 512 across the display screen 101.

The fold mirror 540, the horizontal scanner 550, and the vertical scanner 560 are compactly arranged. In particular, the inclusion of the fold mirror 540 allows the horizontal scanner 550 and the vertical scanner 560 to be located closely to each other. To achieve this, the fold mirror 540 is mounted adjacent to the support structure of the vertical scanner 560, as described further below. This arrangement of having the fold mirror 540 on or adjacent to the support structure of the vertical scanner 560 advantageously facilitates compactness of the overall scanning module 610. This arrangement also permits the scanning beam 512 to impinge the horizontal scanning mirror 550 at close to normal incidence, thus reducing optical distortions effects keystone effect and thus improving image quality.

To scan the beam 512 along the entire two-dimensional X/Y surface of the display screen 101, the horizontal scanner 550 and the vertical scanner 560 each oscillate about a respective axis, as described further below. The oscillations of the horizontal scanner 550 provide the horizontal scanning of the light beam on the display screen 101. The oscillations of the vertical scanner 560 provide the vertical scanning of the light beam on the display screen 101. In operation, the horizontal scanner 550 oscillates faster than the vertical scanner 560.

Figure 6:
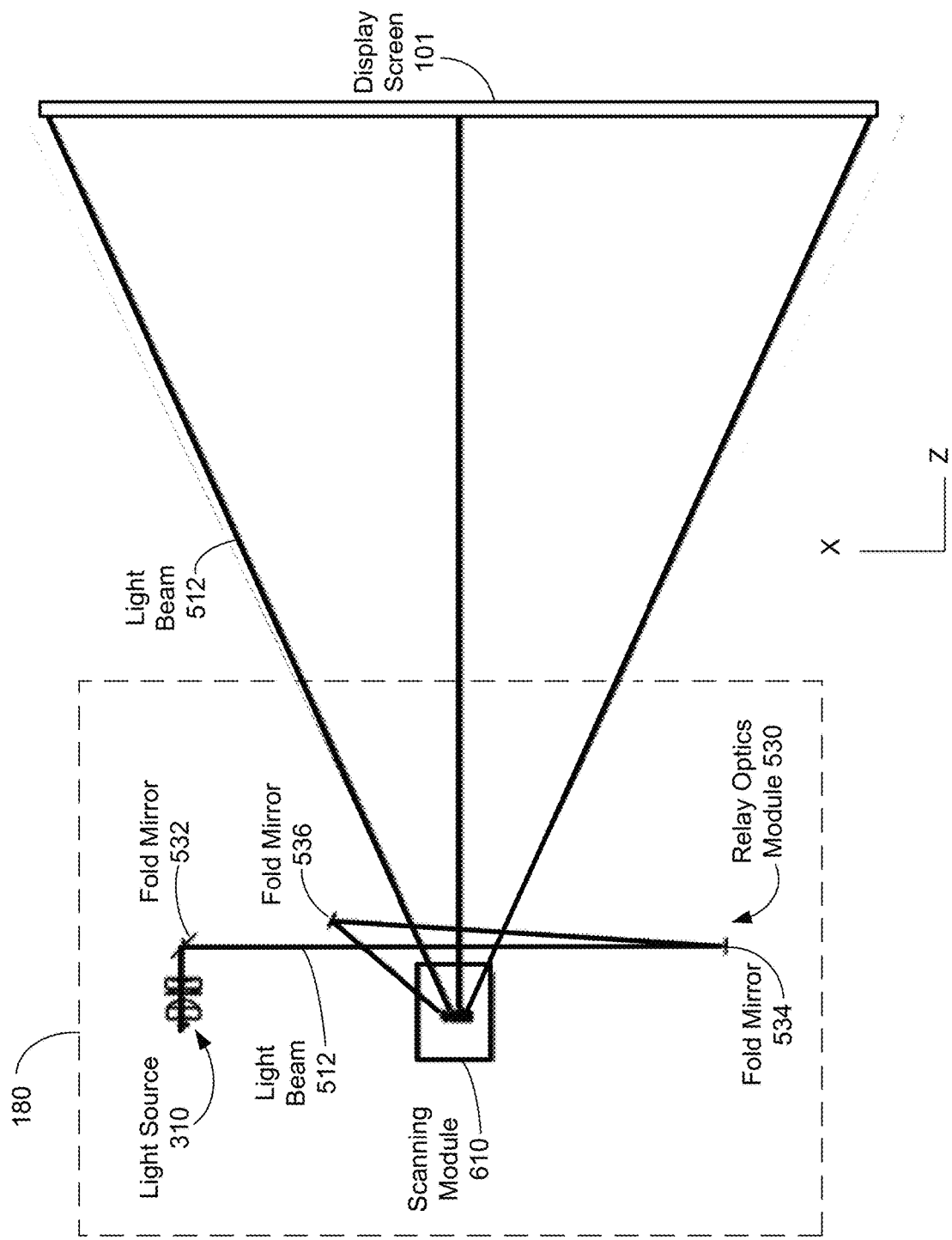
FIG. 6 is a schematic illustration of a top view (plan view) of light paths in an example implementation of a scanning beam display system.

FIG. 6 provides another schematic illustration of the relay optics module 530, scanning beam engine 180, and the display screen 101. The depicted implementation of the scanning beam engine 180 includes the light source 310 that emits an excitation beam, the relay optics module 530 (represented here by the multiple fold mirrors 532, 534, and 536) and the scanning module 610. The excitation beam emitted from the light source 310 approaches the first fold mirror 532, e.g., at about a 45° angle of incidence. The first fold mirror 532 reflects the excitation beam to the second fold mirror 534 at about 90° relative to the incoming excitation beam. In some implementations, the second fold mirror 534 reflects the excitation beam, e.g., at about a 3° to 4° angle, to the third fold mirror 536. In some implementations, the third fold mirror 536 reflects the excitation beam, e.g., at about a 36° to 37° angle to the scanning module 610. The first fold mirror 532 can be closer along the depth or Z-axis to the scanning module 610 than the second fold mirror 534. Similarly, the second fold mirror 534 can be closer along the depth or Z-axis to the scanning module 610 than the third fold mirror 534. The excitation beam 512 is travelling primarily in the X-Z plane.

The depicted relay optics module 530 with the three fold mirrors 532, 534, and 536 is just one example of the type of optical elements that can be included in the relay optics module 530. In addition, or alternatively, other types of optical elements (e.g., one or more lenses, filters, prisms, other types of mirrors, etc.) can be included along the optical path of the excitation beam in the relay optics module 530. However, the configuration depicted avoids blockage of the light from the scanning module 610 while still being shallow along the Z-axis so as to be compatible with the distance of the scanning beam engine 180 to the display screen 110

Figure 7A:
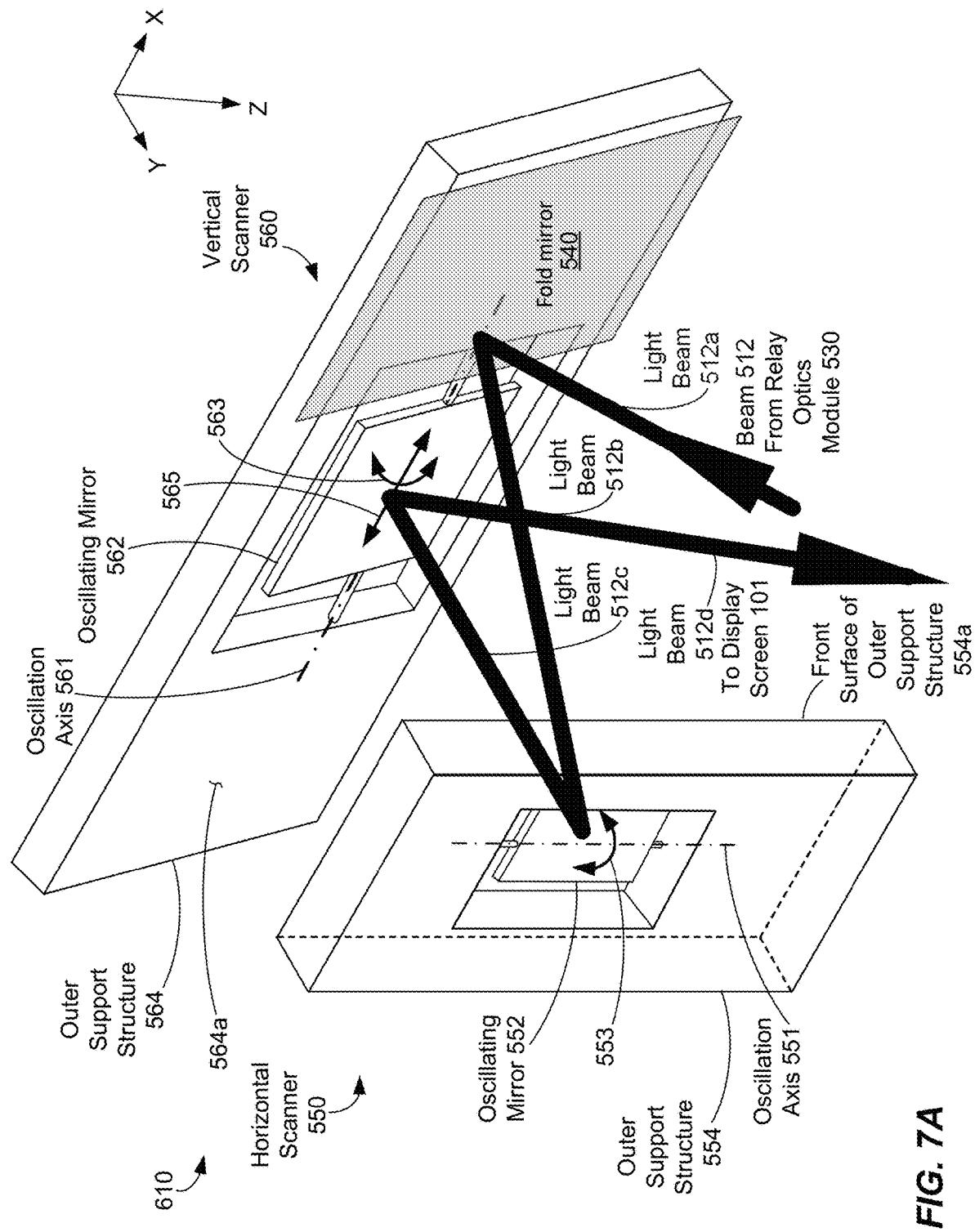
FIG. 7A is a schematic illustration of an example two-axis scanner that can be used with the scanning beam display system of FIG. 6.
Figure 7B:
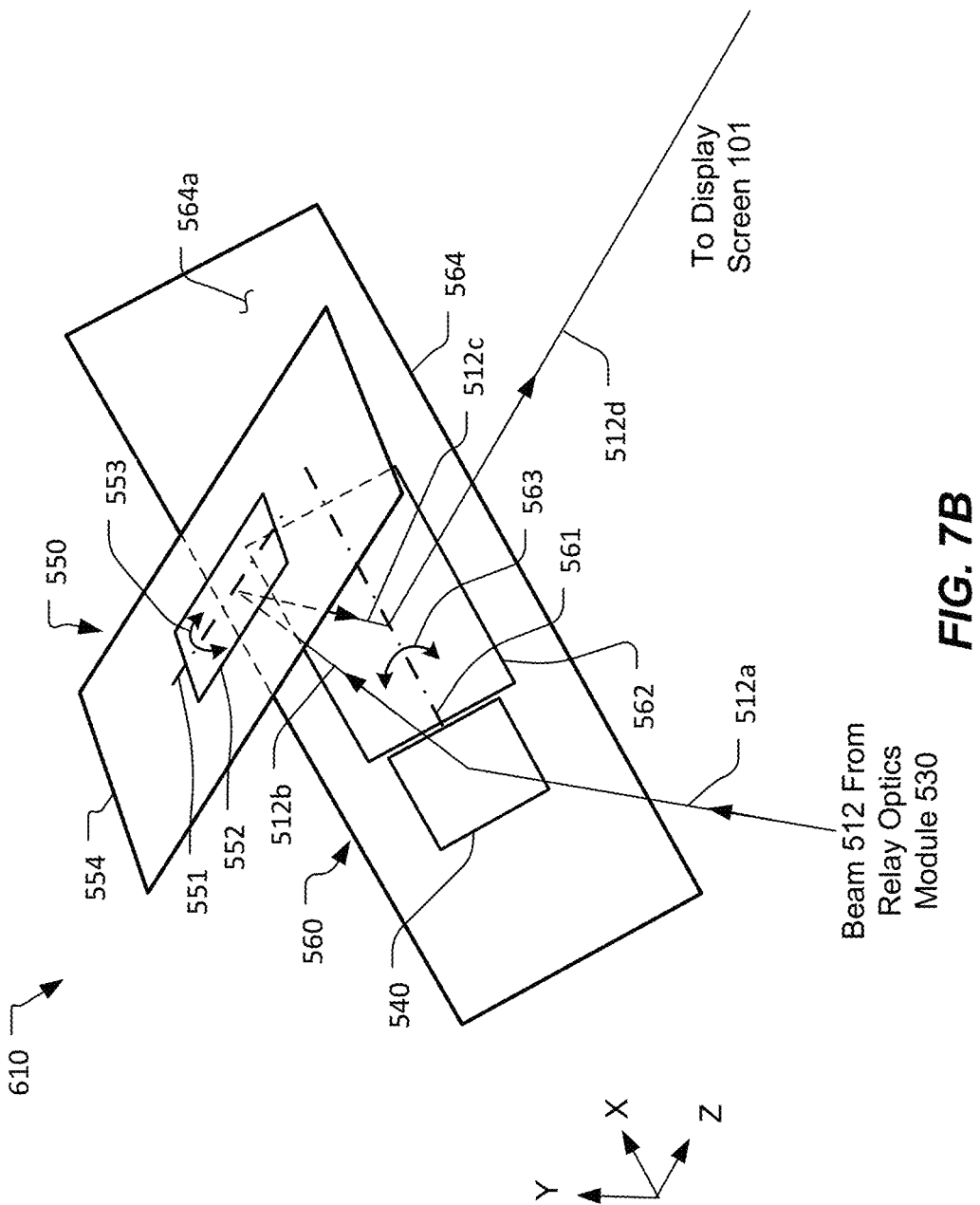
FIG. 7B illustrates the two-axis scanner of FIG. 7A from another viewing perspective.

FIGS. 7A and 7B provide additional schematic illustrations of the scanning module 610. The scanning module 610 includes the fold mirror 540, the horizontal scanner 550, and the vertical scanner 560.

The horizontal scanner 550 includes a first mirror 552 (also referred to as a horizontal scan mirror) suspended on an outer support structure 554. The first mirror 552 is pivotably attached to the outer support structure 554. In particular, the mirror 552 is pivotable relative to the outer support structure 554 about a first axis 551. The horizontal scanner 550 can drive the scanning mirror 552 to oscillate about the first axis 551. That is, the oscillating mirror 552 oscillates (as indicated by the double arrow 553) relative to the outer support structure 554 about the first axis 551. However, when the first mirror 552 is in its neutral position, the planar surface of the mirror 552 can be parallel to, e.g., coplanar with, a front surface 554a of the outer support structure 554. The horizontal scanner 550 can be, for example, a resonant scanning mirror, and can be provided by a resonant scanning mirror chip fabricated using MEMS ("micro-electromechanical systems") techniques.

MEMS scanning mirrors, such as the scanning mirrors described herein, can operate using various modes of actuation. In some implementations, MEMS scanning mirrors can operate using electrostatic actuation. MEMS scanning mirrors can operate using electro-magnetic actuation. Further, in some implementations MEMS scanning mirrors can operate using thin-film piezo (PZT, Lead (Pb) Zirconate Titanate) technology.

The vertical scanner 560 includes a second mirror 562 (also referred to as a vertical scan mirror) and an outer support structure 564. The second mirror 562 is pivotably attached to the outer support structure 564. In particular, the second mirror 562 is pivotable relative to the outer support structure 564 about a second axis 561. The axes 551 and 561 are substantially orthogonal to each other (e.g., 90°+/−5°). In the depicted implementation, the axis 561 extends horizontally.

The fold mirror 540 is positioned on or adjacent the vertical scanner 560 with the surface of the fold mirror 540 being parallel to the planar surface of the second mirror 562 (when the second mirror 562 is in its neutral position), and is parallel with the front surface 564a of the outer support structure 564. In the depicted implementation, the fold mirror 540 is planar.

Ideally, the reflective surface of the fold mirror 540 should lie in the same plane as the neutral position of the vertical oscillating mirror 562. Therefore, one embodiment of the fold mirror 540 would be to make it from a very thin substrate, such as what is commercially available as "cover slips" for microscope slides. The cover slip could be coated to make it sufficiently reflective. This cover slip could be supported from the surface 564a of the vertical scanner 560 by very thin stand-offs, or supported by a bracket that surrounds and cradles the outer support structure 564 while supporting the cover slip just microns from the surface 564a. Another embodiment of the fold mirror 540 can be an optical pellicle; again, coated to make it sufficiently reflective.

In operation, the light beam 512a incoming from the relay optics 530 impinges first on the fold mirror 540. The fold mirror 540 reflects the light beam 512b to the oscillating mirror 552 of the horizontal scanner 550. The components are positioned so that the light beam 512a impinges the fold mirror 540 at a position substantially on the second axis 561, albeit offset along the Z-axis by the amount that the fold mirror is positioned above the second axis 561. The light beam 512a impinges the fold mirror 540 at an incidence angle of about 50° in azimuth and 40° in elevation. Once reflected, the light beam 512b is travelling in a plane that is coplanar with the second axis 561 and normal to the first axis 551. In the depicted implementation, the fold mirror 540 is arranged to reflect the light beam 512b directly to the oscillating mirror 552 along a path that is free of any intervening optical components.

The first mirror 552 of the horizontal scanner 550 reflects the light beam 512c to the second mirror 562 of the vertical scanner 560. In the depicted implementation, the horizontal scanner 550 is arranged to reflect the light beam 512c directly to the vertical scanner 560 along a path that is free of any intervening optical components. The second mirror 562 of the vertical scanner 560 reflects the light beam 512d to the display screen 101. In the depicted implementation, the vertical scanner 560 is arranged to reflect the light beam 512d directly to the display surface along a path that is free of any intervening optical components that would refract or reflect the light path, e.g., no lenses or mirrors.

Assuming both the first mirror 552 and second mirror 562 are in a "neutral" position, i.e., parallel to the surface of their respective support structures 554 and 564, the horizontal and vertical scanners are oriented so that the light beam 512d strikes at substantially the center of the display region 110 for the optical engine. On the other hand, when the second mirror 562 is at a "maximum" deflection so as to direct the light beam 512d to the uppermost scan line in the display region 110, the light beam 512d will pass just "below" the outer support structure 554 of the horizontal scanner 550 on the way to the display screen 101.

In order to avoid curved scan lines at the screen 101, the beams incident on the horizontal scan mirror 552 and the vertical scan mirror 562 are made to be orthogonal to their respective rotational axes (551 and 561).

Continuing discussion with both the first mirror 552 and second mirror 562 in the "neutral" position, in the depicted implementation, the light beam 512b reflected from the fold mirror 540 toward the first mirror 552 impinges the horizontal scanner 550 substantially perpendicular to the first axis 551. The light beam 512c reflected from the first mirror 552 toward the second mirror 562 is also substantially perpendicular to the first axis 551. In addition, the light beam 512c reflected from the first mirror 552 toward the second mirror 562 impinges the vertical scanner 560 substantially perpendicular to the second axis 561. Accordingly, the light beams 512b and 512c are coplanar with the axis 561. The plane that contains the light beams 512b and 512c and the axis 561 is perpendicular to the axis 551.

The depicted arrangement of the scanning module 610 with the fold mirror 540 located as shown advantageously allows for the distance between the first and second mirrors 552 and 562 to be reduced. This facilitates overall compactness of the scanning module 610 and the display system of which it is a part. In addition, the depicted arrangement allows the spot pattern or foot print of the light beams 512a-d to be less elliptical (more circular). The more circular spot pattern can advantageously avoid or reduce clipping. In order to keep the projected beam footprints on the first and second scan mirrors 552 and 562 to a minimum (so the entire beam is reflected without clipping), the incident angle on the first and second scan mirrors 552 and 562 should be minimized. The fold mirror 540 works to minimize the incident angle on the horizontal scan mirror (i.e., the first mirror 552). The use of the fold mirror 540 also minimizes the angle of incidence of the light beam 512d relative to the first mirror 552.

In addition, placement of the horizontal scanner 550 above (or below) the plane normal to the neutral position of the second mirror 562 permits a direct, unobscured path from the vertical scanner 560 to the display screen 101. In some implementations, the path from the vertical scanner 560 to the display screen 101 is free from any intervening optical components. Alternatively, in some implementations the path from the vertical scanner 560 to the display screen 101 can include one or more mirrors (e.g., a single fold mirror) and/or lenses.

In order to maximize the projected screen area, the horizontal and vertical scan angles are maximized. In order to maximize the horizontal scan angle, the distance between the horizontal scan mirror 552 and vertical scan mirror 562 is minimized.

Turning now to a scanning operation, the oscillation of the first mirror 552 about its axis 551 causes the light beam 512c to oscillate "horizontally" across the second mirror 562 as indicated by the double arrow 565. In particular, the light beam 512c oscillates across the second mirror 562 along the axis 561 of the second mirror 562, e.g., along the X-axis. Similarly, the oscillations of the second mirror 562 cause the light beam 512d to oscillate upward and downward (vertically), e.g., along the Y-axis. This can result in vertical scanning of the light beam 512d on the display screen 101.

The combined simultaneous oscillations of the first and second mirrors 552 and 562 cause the light beam 512d to scan horizontally and vertically across the display screen 101. In some implementations, the combined simultaneous oscillations of the first and second mirrors 552 and 562 cause the light beam 512d to traverse a sinuous path.

In some implementations, the horizontal scanner 550 comprises a resonant MEMS scanning mirror microchip. That is, the oscillating mirror 552 can be a piezoelectric mirror that is configured to oscillate at a resonant frequency in response to electrical energization of the horizontal scanner 550 (e.g., by applying an AC voltage). In some implementations, the resonant frequency of the oscillating mirror 552 is in a range between 10 kHz to 50 kHz, or between 25 kHz and 30 kHz, without limitation. In some implementations, the oscillating mirror 552 has a nominal resonant frequency of 25 kHz. Such a resonant scanner relies on the drive signal to excite the mechanical resonant mode of the first mirror 552. The resonant mode of the scanner is governed by the mass and dimensions of the first mirror 552, as well as the stiffness of the torsion arms extending between the first mirror 552 and the outer support structure 554. Because MEMS devices are so small and lightweight, the resonant frequencies are typically in the tens of kilohertz. The drive signal could be a square wave, but the drive frequency should be matched to the natural resonance of the first mirror 552.

The oscillating mirror 552 is supported by the outer support structure 554 which can have electrical circuitry formed thereon. In some implementations, the size of the horizontal scanner 550 (the outer profile of the outer support structure 554) is about 4 mm by 2.5 mm (e.g., about 4 mm in height and about 2.5 mm in width). In some implementations, the size of the oscillating mirror 552 ranges from about 1 mm to about 1.2 mm in diameter. In some implementations, the oscillating mirror 552 can oscillate by about +/−14° or more from its neutral position, in a sinusoidal manner.

In some implementations the vertical scanner 560 comprises a single-axis, linear MEMS scanning mirror microchip (also referred to as a linear scan chip, linear mirror chip, or linear scanning assembly). In some implementations, the oscillating mirror 562 can be a piezoelectric mirror that is configured to tilt to a controlled position in response to an electrical signal. By applying an oscillating electrical signal, the second mirror 562 can be driven to perform oscillating pivoting motion around the second axis 561. In some implementations, the electrical signal delivered to the oscillating mirror 562 can be in the form of a sawtooth wave having frequency range in a range of 30 Hz to 1 kHz, or between 60 Hz to 270 Hz, without limitation. In some implementations, the electrical signal delivered to the oscillating mirror 562 can nominal frequency of about 60 Hz. The motion of the second mirror 562 follows the shape of the applied signal. Therefore, a triangle wave produces a triangle scan; a sawtooth wave produces a sawtooth scan, etc. In order to achieve a scan profile that matches the drive signal profile, the frequencies must be very low compared to those of the resonant scanner.

The oscillating mirror 562 is supported by the outer support structure 564 which can have electrical circuitry formed thereon (e.g., an etched silicon wafer). In some implementations, the size of the vertical scanner 560 (the outer profile of the outer support structure 564) is about 8 mm by 2.5 mm (e.g., about 2.5 mm in height and about 8 mm in width). In some implementations, the oscillating mirror 562 is generally rectangular and has a size of about 2.5 mm by 1.5 mm. In some implementations, the oscillating mirror 552 can oscillate by about +/−8° or more from its neutral position, in a controlled linear manner.

Figure 8:
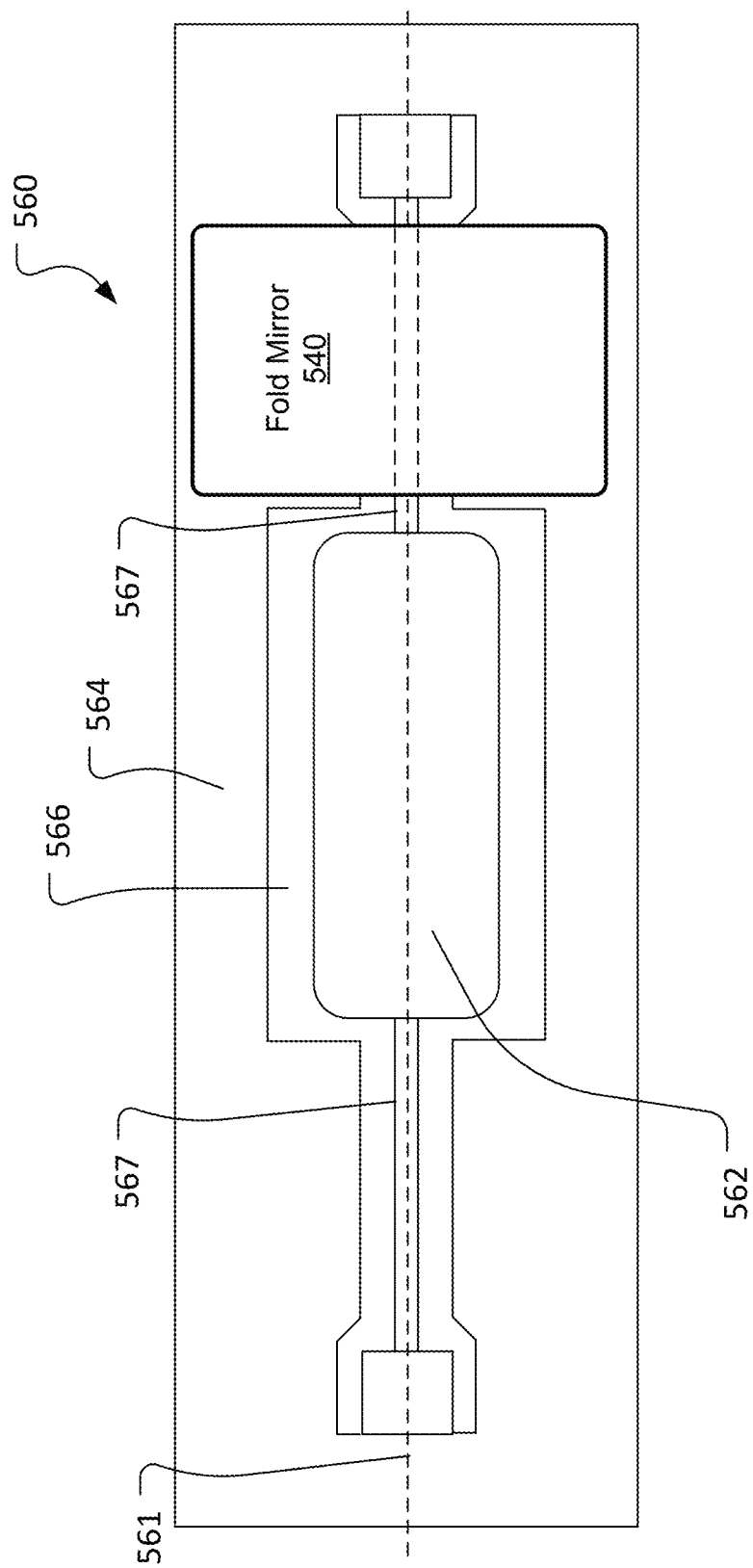
FIG. 8 is a schematic top view of an example linear mirror chip and an example fold mirror that can be used as part of the X/Y scanner of FIGS. 7A and 7B.

Referring also to FIG. 8, the oscillating mirror 562 is suspended above or in a cavity 566 defined by the outer support structure 564. The oscillating mirror 562 is coupled to the support structure 564 by one or more torsion arms 567 (e.g., two torsion arms 567 in the depicted implementation), or the oscillating mirror 562 can held in position relative to the support structure 564 by some other support mechanism. The one or more torsion arms 567 permits the oscillating mirror 562 to rotate about the axis 561 that through along the one or more torsion arms 567. In some implementations, the vertical scanner 560 can include one or more induction coils (not shown) that can be energized to cause the oscillating mirror 562 to oscillate about the axis 561. Alternatively, in some implementations capacitive control, or piezoelectric transducer control can be used to cause the oscillating mirror 562 to oscillate about the axis 561.

The fold mirror 540 comprises a planar reflective surface. The reflective surface of the fold mirror 540 can be arranged parallel to the planar surface 564a (see FIGS. 7A and 7B) of the outer support structure 564 of the vertical scanner 560 on the side of the support structure 564 that faces the horizontal scanner 550. The planar reflective surface of the fold mirror 540 is parallel to the planar reflective surface of the oscillating mirror 562 when the oscillating mirror 562 is in its neutral position. In some implementations, the fold mirror 540 is slightly (e.g., about 50 µm or less) above (toward the horizontal scanner 550) the surface of the outer support structure 564.

The fold mirror 540 is positioned along the direction of the oscillation of the light beam 512c as indicated by the double arrow 565. In particular, the fold mirror 540 covers a portion of the outer support structure 564. In some implementations, the portion of the outer support structure 564 covered by the fold mirror 540 is an active portion that is used to control the oscillations of the oscillating mirror 562. The portion of the outer support structure 564 covered by the fold mirror 540 is positioned on a side of the oscillating mirror 562 along a scanning direction (see arrow 565) of the light beam 512c reflected from the oscillating mirror 552 of the horizontal scanner 550. In some implementations, the fold mirror 540 is positioned to cover at least a portion of one torsion arm from the one or more torsion arms 567.

In some implementations, the fold mirror 540 is configured to reflect the light beam 512b to exclusively within an outer periphery of the oscillating mirror 552 of the horizontal scanner 550. In such a case, the light beam 512b is advantageously prevented from hitting any part of the outer support structure 554, which could cause a loss of image quality. To that end, in some implementations the fold mirror 540 includes an appropriately-sized reflective central portion and an optically absorptive, e.g., black, material surrounding the mirror 552. Alternatively or additionally, in some implementations the fold mirror 540 includes a strategically-sized aperture to limit the size of the light beam 512b reflected from the fold mirror 540 to within the outer periphery of the oscillating mirror 552.

In some portions of this description, the position or movement of the light beams is discussed. Depending on context, this can refer to the position or movement of the spot of impingement of the light beam on a mirror or on the screen.

While this patent application contains many specifics, these should not be construed as limitations on the scope of an invention or of what may be claimed, but rather as descriptions of features specific to particular embodiments of the invention. Certain features that are described in this patent application in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this patent application. For example:

The separate servo beam can be omitted, and the excitation beams 320 can be used as the servo beam. In this case, servo reference marks on the screen 101 can have different reflectivity to excitation beam 320 than surrounding areas, thereby producing feedback light 132.
  A single display region 110 can be scanned by more than one excitation beam 320. For example, multiple excitation beams can be fed through the scanning projection module 610 and reflected in common from the polygon mirror and resonant scan mirror.

Accordingly, other embodiments are within the scope of the following claims.

What is claimed is:

1. A display system comprising:
a display screen;
a light source to generate a light beam modulated in accordance with image data; and
a beam scanning module to receive the light beam and to direct the light beam onto an associated display region of the display screen, the beam scanning module comprising:
   a resonant mirror configured to scan the light beam along a first scanning direction across the associated display region;
   a linear mirror chip configured to scan the light beam along a second scanning direction across the associated display region and comprising: (i) an outer support structure with electrical circuitry formed thereon and (ii) a linear mirror pivotably coupled to the outer support structure, the linear mirror arranged to redirect the light beam from the resonant mirror; and
   a fold mirror covering a portion of the outer support structure, the portion positioned on a side of the linear mirror along a scanning direction of the resonant mirror across the linear mirror chip, the fold mirror positioned to reflect the light beam from the light source to the resonant mirror,
wherein the linear mirror is pivotably coupled to the outer support structure by a torsion arm, and wherein the fold mirror covers at least a portion of the torsion arm.

2. The system of claim 1, wherein the display screen comprises fluorescent material, and the light beam is an excitation beam to cause portions of the fluorescent material to fluoresce.

3. The system of claim 2, wherein the fluorescent material comprises parallel stripes of the fluorescent material extending along the second scanning direction.

4. The system of claim 1, wherein the resonant mirror is pivotable about a first axis, wherein the linear mirror is pivotable about a second axis, and wherein the first axis is orthogonal to the second axis.

5. The system of claim 4, wherein the fold mirror is arranged to reflect the light beam directly to the resonant mirror along a path that is free of any intervening optical components.

6. The system of claim 5, wherein the fold mirror is arranged to reflect the light beam substantially perpendicular to the first axis.

7. The system of claim 1, wherein the portion of the outer support structure covered by the fold mirror is configured to control pivoting movements of the linear mirror.

8. The system of claim 4, wherein the fold mirror is planar and parallel to a plane of the outer support structure.

9. The system of claim 1, wherein the fold mirror is configured to reflect the light beam exclusively to within an outer periphery of the resonant mirror.

10. A two-axis scanner system comprising:
a resonant mirror configured to receive a light beam directly from a fold mirror and to scan the light beam along a first scanning direction;
a linear mirror chip configured to receive the light beam from the resonant mirror and to scan the light beam along a second scanning direction, the linear mirror chip comprising: (i) an outer support structure and (ii) a linear mirror pivotably coupled by a torsion arm to the outer support structure; and
the fold mirror, wherein the fold mirror is positioned to cover a portion of the outer support structure on a side of the linear mirror along a scanning direction of the resonant mirror across the linear mirror chip,
wherein the fold mirror covers at least a portion of the torsion arm.

11. The system of claim 10, wherein the resonant mirror is pivotable about a first axis, wherein the linear mirror is pivotable about a second axis, and wherein the first axis is orthogonal to the second axis.

12. The system of claim 11, wherein the fold mirror is arranged to reflect the light beam orthogonally to the first axis.

13. The system of claim 10, wherein the portion of the outer support structure covered by the fold mirror is configured to control pivoting movements of the linear mirror.

14. The system of claim 10, wherein the fold mirror is planar and parallel to a plane of the outer support structure.

15. A light engine for a display system, the light engine comprising:
a light source to generate a light beam modulated in accordance with image data; and
a two-axis beam scanning system to receive the light beam from the light source and to direct the light beam onto a display screen, the two-axis beam scanning system comprising:
   a resonant mirror configured to receive a light beam from a fold mirror and to scan the light beam along a first scanning direction;
   a linear mirror chip configured to receive the light beam from the resonant mirror and to scan the light beam along a second scanning direction, the linear mirror chip comprising: (i) an outer support structure and (ii) a linear mirror pivotably coupled by a torsion arm to the outer support structure; and
   the fold mirror, wherein the fold mirror is positioned to cover at least a portion of the torsion arm.

16. The light engine of claim 15, further comprising a controller configured to receive image data including pixel data representing intensity values of pixels and to modulate the light beam in accordance with the image data.

17. The light engine of claim 15, wherein a combination of oscillation of the resonant mirror and pivoting motions of the linear mirror generates a sinuous path for the light beam to traverse.

18. The light engine of claim 15, wherein the resonant mirror is arranged to oscillate about a first axis, wherein the linear mirror is pivotable about a second axis orthogonal to the first axis, and wherein the fold mirror is arranged to reflect the light beam directly to the resonant mirror without any intervening optical components and orthogonally to the first axis.

* * * * *